US010041367B2

(12) United States Patent
Girzone et al.

(10) Patent No.: US 10,041,367 B2
(45) Date of Patent: Aug. 7, 2018

(54) AXIALLY FACED SEAL SYSTEM

(71) Applicant: General Electric Company, Schenectady, NY (US)

(72) Inventors: William Edmund Girzone, Saratoga Springs, NY (US); Xiaoqing Zheng, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 757 days.

(21) Appl. No.: 14/104,155

(22) Filed: Dec. 12, 2013

(65) Prior Publication Data

US 2015/0167486 A1 Jun. 18, 2015

(51) Int. Cl.
| F01D 11/08 | (2006.01) |
| F01D 11/00 | (2006.01) |
| F01D 5/22 | (2006.01) |

(52) U.S. Cl.
CPC .............. *F01D 11/08* (2013.01); *F01D 5/225* (2013.01); *F01D 11/003* (2013.01); *Y02E 20/16* (2013.01)

(58) Field of Classification Search
CPC ........... F01D 11/08; F01D 11/12; F01D 5/225
See application file for complete search history.

(56) References Cited

U.S. PATENT DOCUMENTS

| 4,020,869 A | 5/1977 | Davis et al. |
| 4,057,362 A * | 11/1977 | Schwaebel ............... F01D 11/02 277/419 |
| 4,812,105 A | 3/1989 | Heymann |
| 5,169,159 A | 12/1992 | Pope et al. |
| 5,975,537 A | 11/1999 | Turnquist et al. |
| 6,926,495 B2 * | 8/2005 | Diakunchak ............ F01D 11/02 415/12 |
| 7,201,238 B2 | 4/2007 | Marvin et al. |
| 7,261,300 B2 | 8/2007 | Agrawal et al. |
| 7,984,911 B2 | 7/2011 | Dobek et al. |
| 8,167,545 B2 | 5/2012 | Glahn et al. |
| 8,201,834 B1 | 6/2012 | Liang |
| 8,777,563 B2 * | 7/2014 | Sarawate ............... F01D 11/001 415/174.2 |
| 2012/0195741 A1 * | 8/2012 | Sarawate ............... F01D 11/001 415/170.1 |
| 2012/0248704 A1 * | 10/2012 | Fennell .................. F01D 11/025 277/360 |

(Continued)

FOREIGN PATENT DOCUMENTS

| EP | 0331401 A2 | 9/1989 |
| EP | 0380990 A2 | 8/1990 |

(Continued)

*Primary Examiner* — David E Sosnowski
*Assistant Examiner* — Juan G Flores
(74) *Attorney, Agent, or Firm* — Ernest G. Cusick; Hoffman Warnick LLC

(57) ABSTRACT

A first aspect of the invention provides an axially faced seal system for a radial tip of a turbine component, the system comprising: a stationary turbine component; a rotating turbine component; and a seal ring mounted to the stationary turbine component, the seal ring extending axially to the rotating turbine component and engaging the rotating turbine component on a side surface, wherein the side surface of the rotating turbine component is on a continuous, rotating mating ring having a 360 degree arc.

10 Claims, 10 Drawing Sheets

(56) References Cited

U.S. PATENT DOCUMENTS

2012/0280458 A1 11/2012 Artiles et al.

FOREIGN PATENT DOCUMENTS

| | | | |
|---|---|---|---|
| EP | 0419871 | A1 | 4/1991 |
| EP | 0426041 | A1 | 5/1991 |
| EP | 0426318 | A2 | 5/1991 |
| EP | 0447272 | A1 | 9/1991 |
| EP | 0458547 | A2 | 11/1991 |
| EP | 0469826 | A2 | 2/1992 |
| EP | 0473018 | A2 | 3/1992 |
| EP | 0523899 | A1 | 1/1993 |
| EP | 0532303 | A1 | 3/1993 |
| EP | 0535850 | A1 | 4/1993 |
| EP | 0565232 | A1 | 10/1993 |
| EP | 0625641 | A2 | 11/1994 |
| EP | 0629798 | A1 | 12/1994 |
| EP | 0657651 | A1 | 6/1995 |
| EP | 0681090 | A2 | 11/1995 |
| EP | 0745794 | A1 | 12/1996 |
| EP | 0681090 | A3 | 7/1997 |
| EP | 0816726 | A1 | 1/1998 |
| EP | 1001139 | A1 * | 5/2000 ............. F01D 11/08 |
| EP | 1785584 | A2 | 5/2007 |
| EP | 1785591 | A2 | 5/2007 |
| EP | 1785594 | A2 | 5/2007 |
| EP | 1900630 | A1 | 3/2008 |
| EP | 1900631 | A1 | 3/2008 |
| EP | 1900632 | A1 | 3/2008 |
| EP | 1900633 | A1 | 3/2008 |
| EP | 1900634 | A1 | 3/2008 |
| EP | 1900636 | A1 | 3/2008 |
| EP | 1905984 | A2 | 4/2008 |
| EP | 1918617 | A1 | 5/2008 |
| EP | 2233700 | B1 | 9/2010 |
| GB | 933618 | A * | 8/1963 ............. F01D 11/08 |

* cited by examiner

AXIALLY FACED SEAL SYSTEM

BACKGROUND OF THE INVENTION

Embodiments of the invention relate generally to turbine components for power generation applications, and, more specifically, to axially faced seal systems configured to radially seal rotating and stationary turbine components (e.g., turbine buckets, turbine nozzles, etc.).

Some power plant systems (e.g., certain nuclear, simple cycle, and combined cycle power plant systems) employ turbines in their design and operation. Some of these turbines include turbine components with airfoil shaped sections (e.g., turbine blades such as buckets and nozzles) which during operation are exposed to fluid flows, portions of which may leak radially over the tips of these components (e.g., between a blade tip and stator of the turbine, through the blade clearance gap, etc.), impacting fluid flow and reducing turbine efficiency. Some power plant systems include radial sealing systems disposed on the stator and/or turbine components which are configured to reduce this leakage by radially sealing this gap (e.g., by reducing and/or eliminating the gap between the component tip and the stator). However, the radial length of these turbine components may be susceptible to thermal expansion and rotor excursions and, as a result, radial steampath rubs may occur between these radial sealing systems and turbine components, resulting in component wear and/or damage. Besides, these radial seal systems may have pressure and/or temperature limitations which limit system applications, design considerations, and/or overall performance of the power generation system.

BRIEF DESCRIPTION OF THE INVENTION

A first aspect of the invention provides an axially faced seal system for a radial tip of a turbine component, the system comprising: a stationary turbine component; a rotating turbine component; and a seal ring mounted to the stationary turbine component, the seal ring extending axially to the rotating turbine component and engaging the rotating turbine component on a side surface, wherein the side surface of the rotating turbine component is on a continuous, rotating mating ring having a 360 degree arc.

A second aspect of the invention provides a rotor comprising: at least one rotating turbine component having a plurality of blades and a radial-extending mating ring attached to the plurality of blades; and at least one axially faced seal system forming a face seal with the at least one rotating turbine component, the at least one axially faced seal system comprising a seal ring extending axially to the at least one rotating turbine component and sealing against a side surface of the mating ring, wherein the mating ring forms a 360 degree continuous arc.

A third aspect of the invention provides a turbine comprising: at least one rotating turbine component having a plurality of blades attached to a rotor; a ring element next to the plurality of blades; at least one stationary turbine component having a radial tip; and at least one axially faced seal system forming a face seal with the at least one rotating turbine component and the at least one stationary turbine component, the at least one axially faced seal system comprising: a sealing ring mounted to the radial tip of the at least one stationary turbine component, extending axially to the rotating turbine component and sealing against a side surface of the ring element, wherein the rotating ring element is a 360 degree arc.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

The above and other aspects, features and advantages of the invention will be better understood by reading the following more particular description of the invention in conjunction with the accompanying drawings.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-10, like numbering may represent like elements. Redundant explanation of these elements has been omitted for clarity. Finally, it is understood that the components of FIGS. 1-10 and their accompanying descriptions may be applied to any embodiment described herein.

DETAILED DESCRIPTION OF THE INVENTION

Aspects of the invention provide for seal systems shaped to axially seal radial tips of turbine components. These axially faced seal systems reduce seal clearances between components and improve turbine and/or power generation system efficiency and operation.

Figure 1:
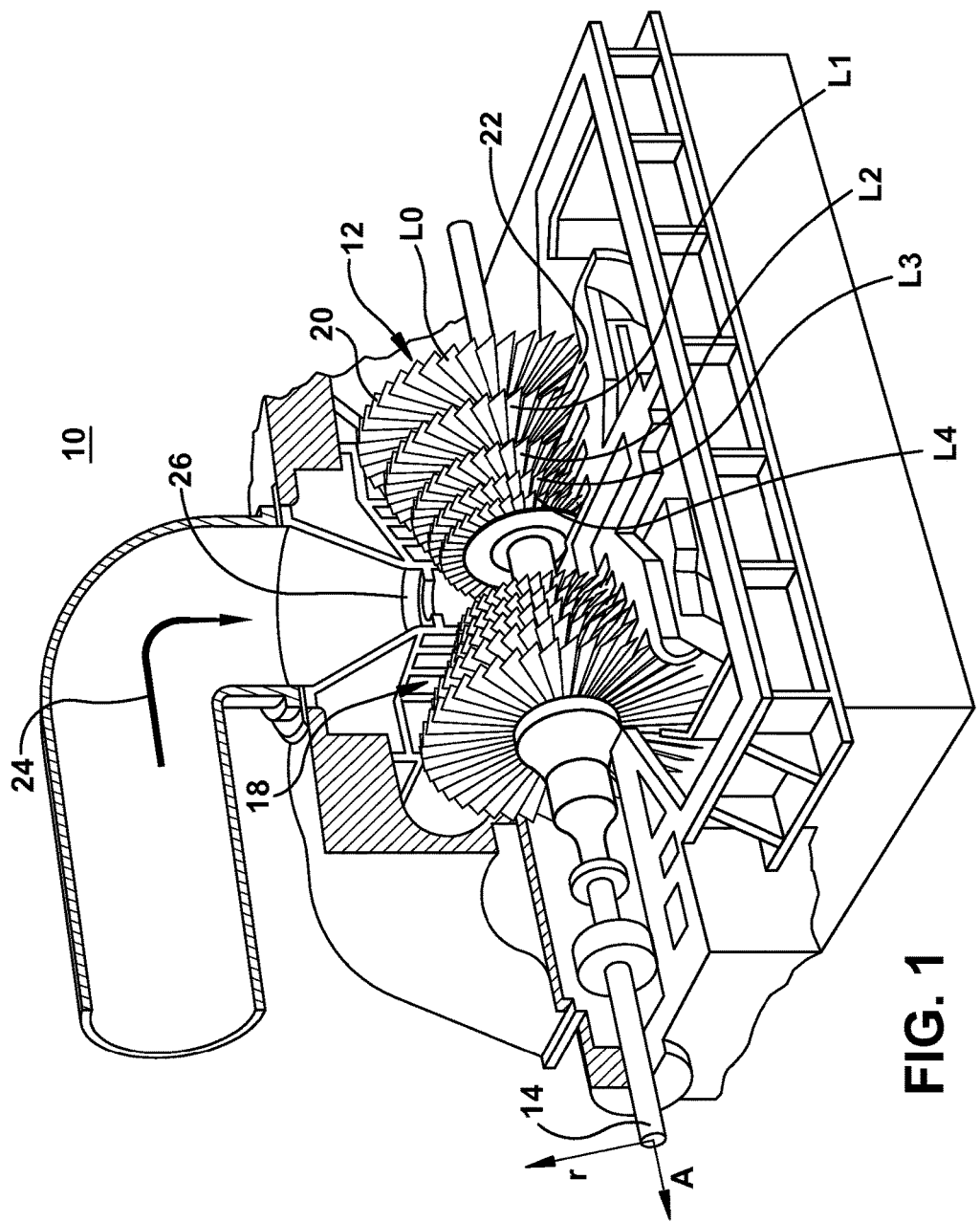
FIG. 1 shows a three-dimensional partial cut-away perspective view of a portion of a turbine according to an embodiment of the invention.

Turning to the drawings, embodiments of systems and devices are shown, which are configured to reduce tip leakage losses in a turbine by providing an axially faced seal system disposed proximate to a radial extent/tip of a turbine component. Each of the components in the drawings may be conventionally connected, e.g., via a common conduit or other known device or apparatus as is indicated in FIGS. 1-10. Referring to the drawings, FIG. 1 shows a perspective partial cut-away illustration of a steam turbine 10. Turbine 10 includes a rotor 12 that includes a rotating shaft 14 and a plurality of rotor wheels 18 spaced along an axial length A of rotating shaft 14. A plurality of rotating blades 20 are mechanically coupled to each rotor wheel 18. More specifically, blades 20 are arranged in rows that extend circumferentially around each rotor wheel 18. A plurality of stationary vanes 22 extend circumferentially around shaft 14, and the vanes are axially positioned between adjacent rows of blades 20. Stationary vanes 22 cooperate with blades 20 to form a stage and to define a portion of a flow path through turbine 10.

In operation, fluid such as steam 24 enters an inlet 26 of turbine 10 and is channeled through stationary vanes 22. Vanes 22 direct steam 24 against blades 20. Steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction, r) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or fewer than five stages. Also, as will be described herein, the teachings of the invention do not require a multiple stage turbine.

Figure 2:
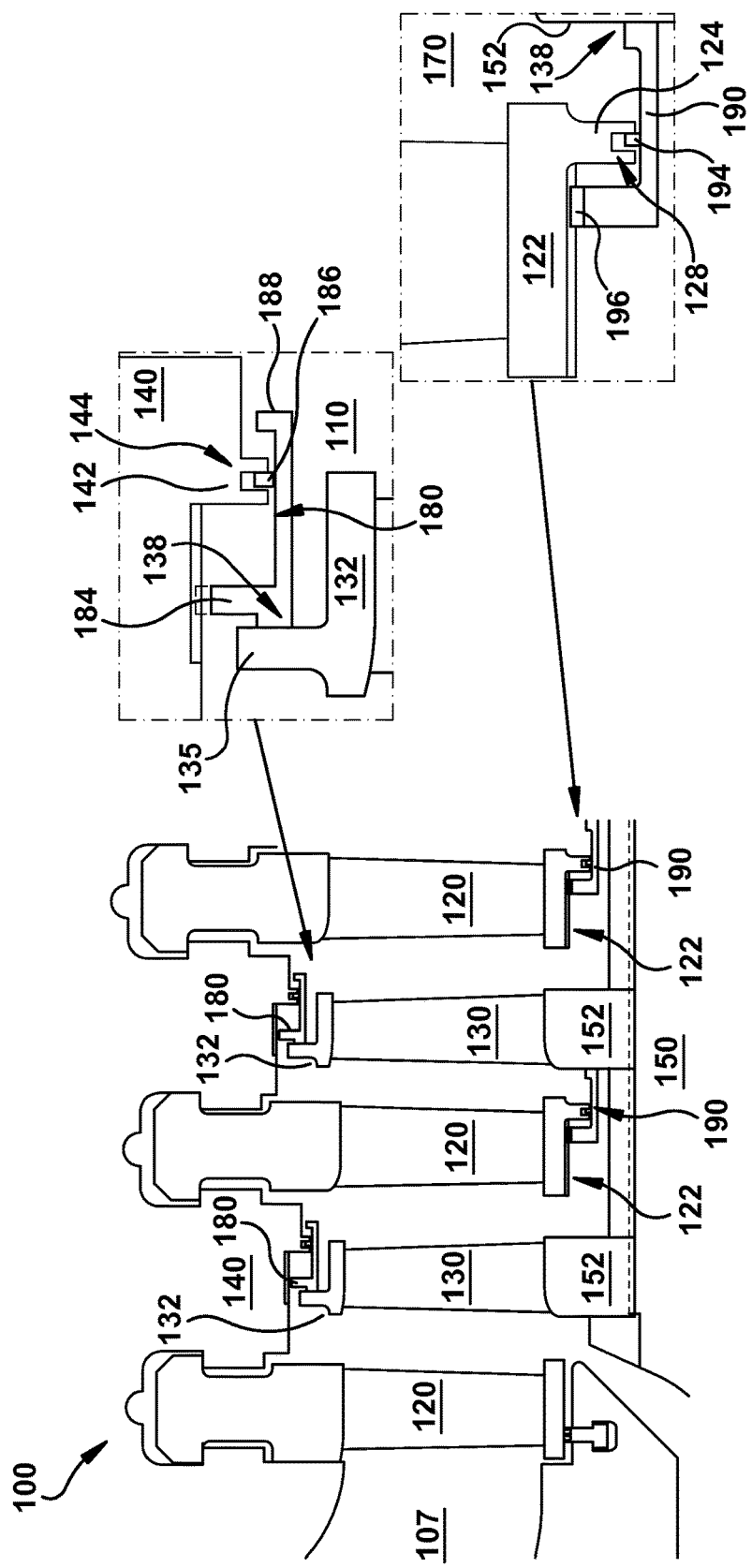
FIG. 2 shows a turbine component in accordance with embodiments of the invention.

Turning to FIG. 2, a schematic cut-away view of a portion of a turbine 100 is shown including a set of first axially faced seal systems 110 and a set of second axially faced seal systems 170 disposed on radial tips of a set of rotating turbine components 130 (e.g., a turbine blade, a bucket, a blade, etc.) and a set of stationary turbine components 120 (e.g., a vane, a nozzle, etc.) in accordance with embodiments of the invention. Stationary turbine components 120 may be connected to a stator 140 of turbine 100 and may extend within a working fluid passage 107. Rotating turbine components 130 may be connected to a rotor 150 of turbine 100 and may rotate through working fluid passage 107 and between set of stationary turbine components 120. In one embodiment, a set of first axially faced seal systems 110 may be connected to a bucket tip (or bucket shroud) 132 of rotating turbine components 130 and may be mounted to stator 140. First axially faced seal system 110 may include a first seal ring 180 which is mounted to stator 140 via a first secondary seal 186 in a seal housing 142 and extends axially toward a mating ring 135 on the bucket tip 132 so as to form a face seal at sealing face 138. Seal ring 180 may include a first anti-rotation element 184 and a stop flange 188, which may extend radially toward stator 140 to limit movement of seal ring 180. Seal ring 180 and secondary seal 186 may be segmented rings, i.e., composed of separate arcuate members which, together, form a 360° arc. Mating ring 135 forms a 360° arc to provide a substantially flat, smooth sealing face 138, while bucket tip (or shroud) 132 may be an integral part of individual rotating turbine component 130 and therefore be segmented. In one embodiment, seal housing 142 may define a channel 144 shaped to accommodate secondary seal 186. Seal housing 142 can be an integral part of stator 140 or a separate component assembled onto stator 140.

In one embodiment, a set of second axially faced seal systems 170 may be connected to a root ring element 152 of rotating turbine components, as shown in FIG. 2. Second axially faced seal system 170 may include a second seal ring 190 which is mounted to a stationary tip cover 122 and extends axially toward sealing surface 138 on root ring element 152. Seal ring 190 may include a second secondary seal 194 and a second anti-rotation element 196 which may extend radially to interlock with stationary tip cover 122. Seal ring 190 and second secondary seal 194 may be segmented rings. The ring element 152 acts as a mating ring to the seal ring 190. Mating ring 152 forms a 360° arc to provide a flat, smooth sealing face 138. Mating ring 152 may be an integral part of rotor 150 or a separate component assembled on rotor 150. In one embodiment, a seal housing 124 may define a channel 128 shaped to accommodate second secondary seal 194. In some embodiments, mating rings 135, 152 of first and second axially-faced seal systems 110, 170, respectively, may be formed as a portion of rotating turbine components 130 and/or rotor 150. That is, mating ring 135 and rotating turbine components 130 may be unitary (e.g., shaped from a single piece of stock material, formed as a uniform body, etc.). Similarly, mating ring 152 and rotor 150 may be unitary. In other embodiments, mating rings 135, 152 may be connected (e.g., bolted, welded, etc.) to rotating turbine components 130, 150.

Figure 3:
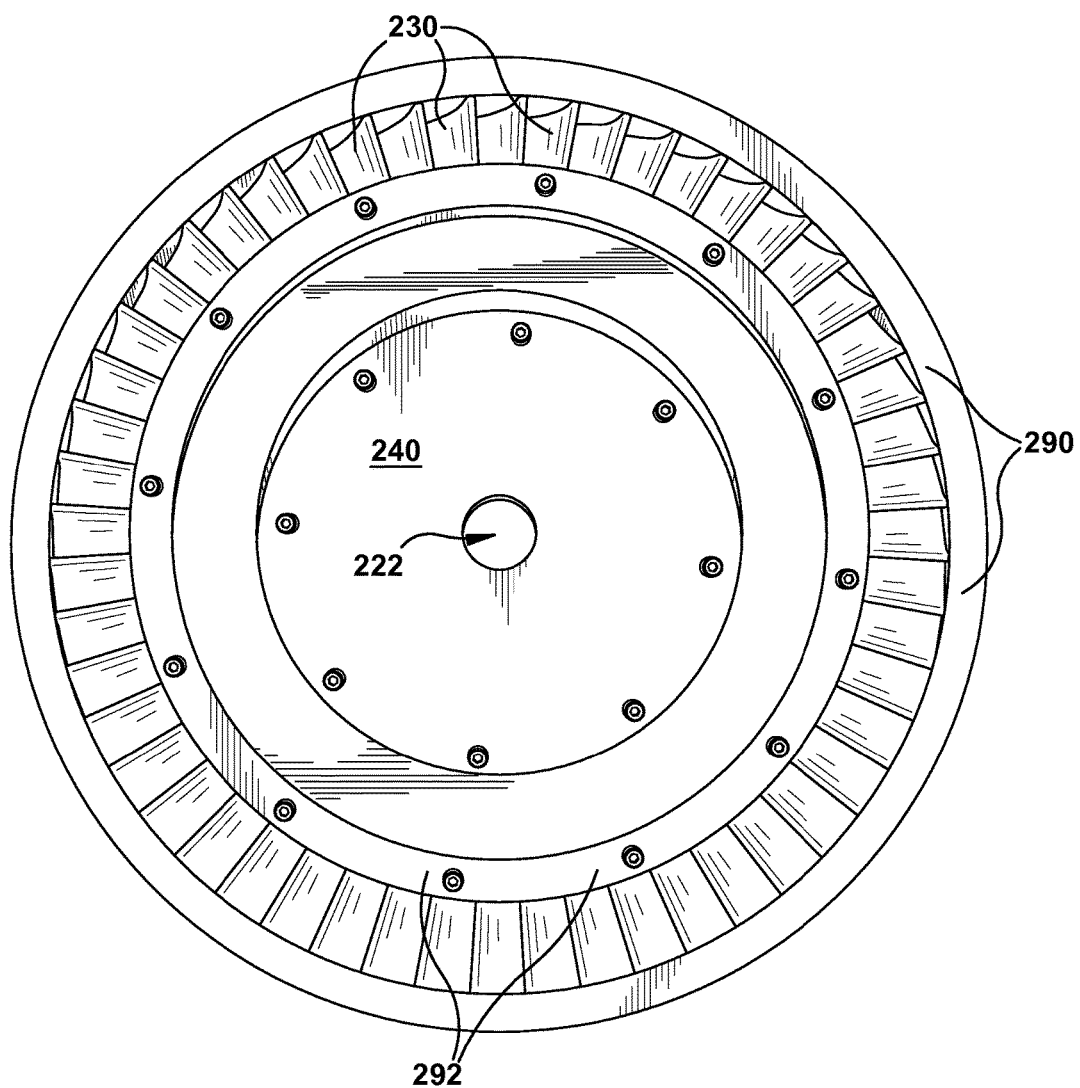
FIG. 3 shows a stationary or rotating turbine component formed as one body is shown with an inner seal surface and an outer seal surface in accordance with one embodiment of the invention.

Turning to FIG. 3, a stationary or rotating turbine component 240 formed as one body is shown with an inner seal surface 292 and an outer seal surface 290 in accordance with embodiments of the invention. In one embodiment, stationary or rotating turbine component 240 defines a rotor bore 222 and a plurality of airfoils 230 which comprise a stage of a turbine. During assembly, a rotor may be passed through rotor bore 222 so as to locate and/or orient stationary or rotating turbine component 240 relative to other stationary or rotating turbine components to define working fluid flow passage 107 (FIG. 2). Inner seal surface 292 and outer seal surface 290 may act as sealing surfaces 138 (FIG. 2) and complement seal surfaces of adjacent stationary or rotating turbine components to form a set of axially faced seals radially inward and radially outward of plurality of airfoils 230 and working fluid flow passage 107 (FIG. 2).

Figure 4:
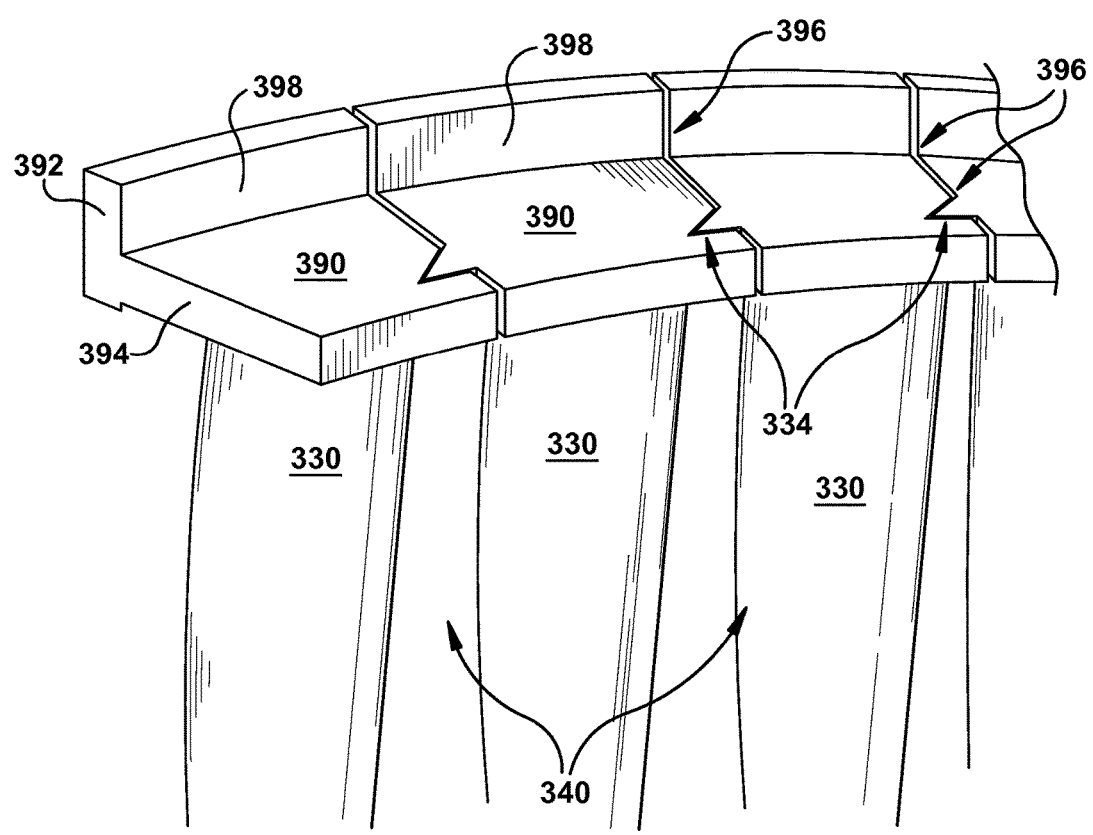
FIG. 4 shows a portion of a set of stationary or rotating turbine components including a set of axially faced seal systems in accordance with one embodiment of the invention.

Turning to FIG. 4, a portion of a set of stationary or rotating turbine components 330 including a set of axially faced seal components 390 are shown in accordance with embodiments of the invention. As shown, axially faced seal components 390 may be segmented with a lock element 334 to limit relative axial movement. Axially faced seal components 390 may be located at a radial tip of turbine components 330 and may include a radial flange 392 which extends radially outward from a base (shroud) 394. In the case that turbine components 330 are rotating buckets, flanges 392 serve as the rotating mating ring and side surface 398 is the seal surface to receive a seal ring 180 (FIG. 2). In the case that turbine components 330 are stationary nozzles, flange 392 serves as the seal housing to hold a seal ring 190 (FIG. 2). In one embodiment, axially faced seal components 390 may include a set of circumferential edges 396 shaped to complement adjacent axially faced seal components 390 and form a substantially continuous axial surface extending either radially outward from rotating blades or radially inward from stationary nozzles. Circumferential edges 396 may be patterned. In one embodiment, circumferential edges may be shaped to form a set of lock elements 334.

Figure 5:
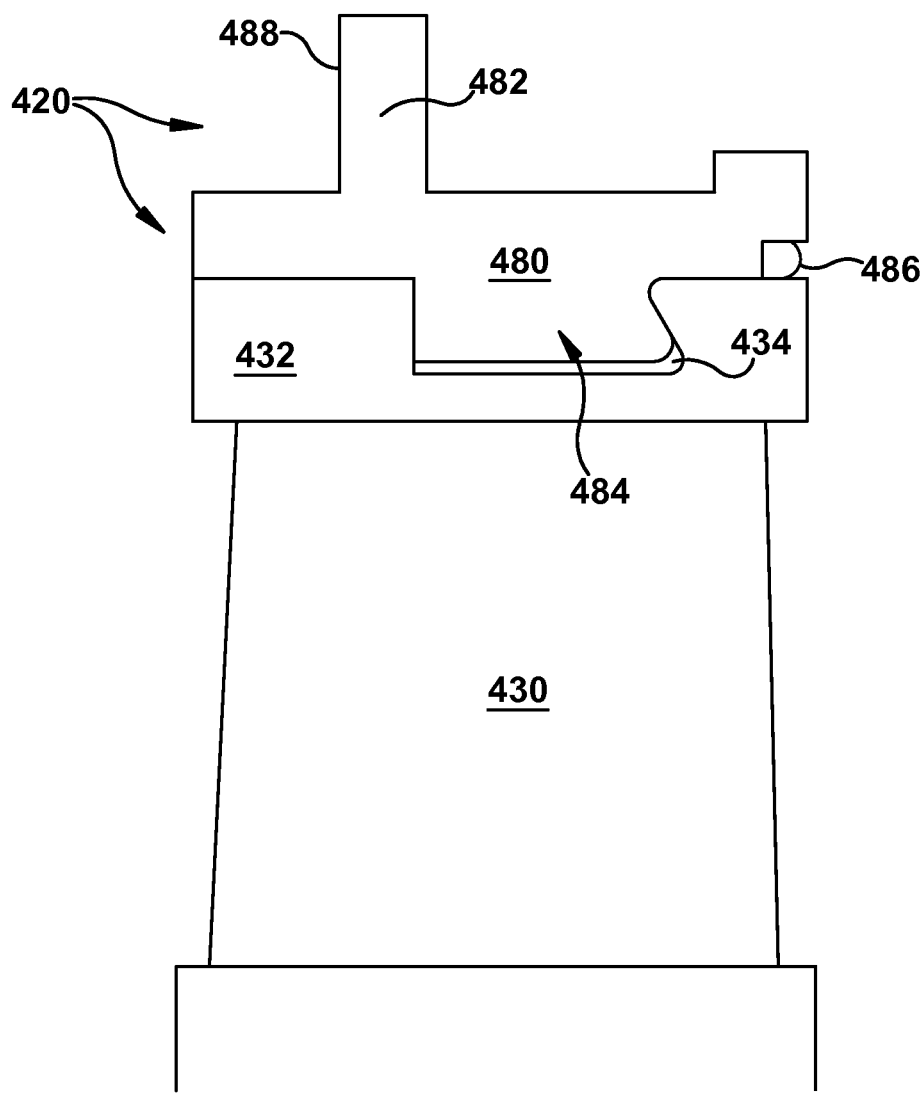
FIG. 5 shows a two-dimensional graphical representation of a seal system connected to a stationary or rotating turbine component in accordance with one embodiment of the invention.

Turning to FIG. 5, a tangential view of a seal system 420 connected to a stationary or rotating turbine component 430 is shown according to embodiments of the invention. In this embodiment, axially faced seal system 420 includes a 360° arc ring 480 which is shaped to connect to a tip 432 of a set of stationary or rotating turbine components 430. Arc ring 480 may include a key member 484 which may complement a cell 434 formed in tip 432, thereby securing arc ring 480 to stationary or rotating turbine component 430. In an embodiment, arc ring 480 may include a radial flange 482 to form a seal surface 488 shaped to form a portion of a mating face seal. In one embodiment, a caulking band 486 may further secure arc ring 480 to tip 432.

Figure 6:
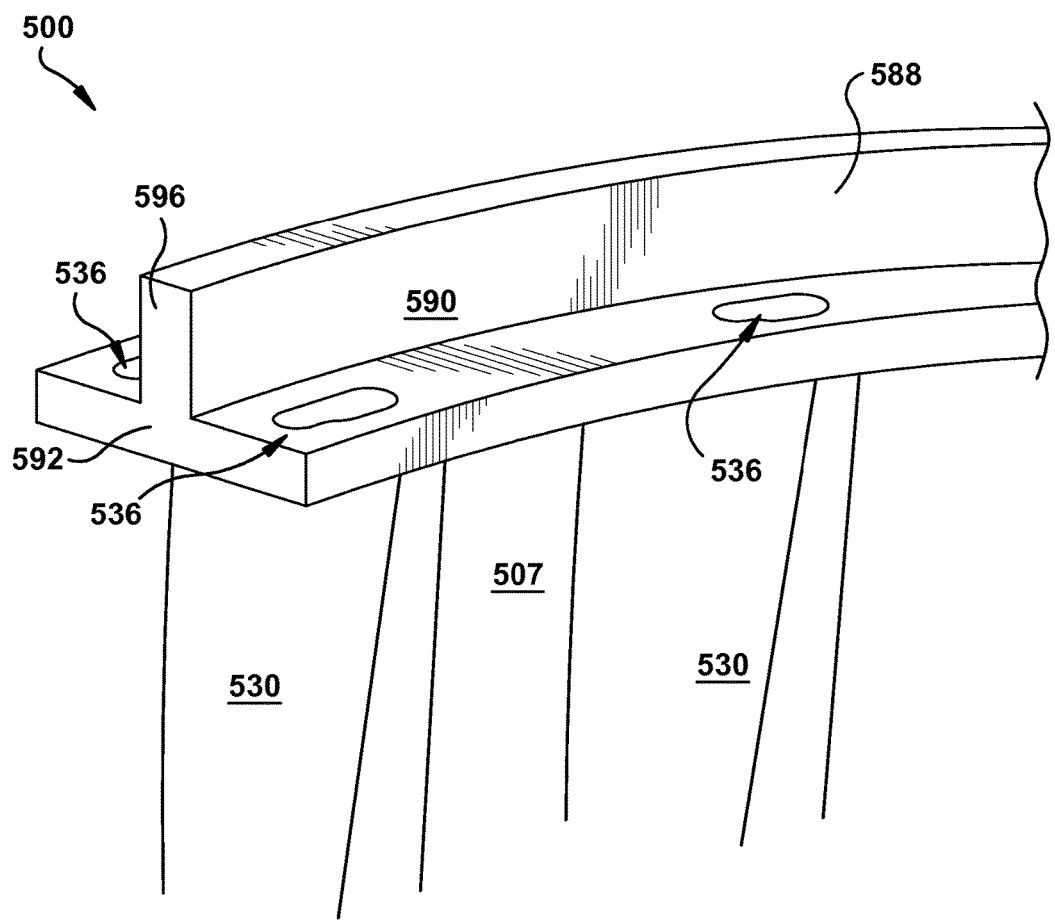
FIG. 6 shows a portion of a turbine including an axially faced seal system connected to a set of stationary or rotating turbine components in accordance with one embodiment of the invention.

Turning to FIG. 6, a portion of a turbine 500 is shown including an axially faced seal system 590 connected to a set of stationary or rotating turbine components 530 in accordance with embodiments of the invention. In an embodiment, axially faced seal system 590 may include a circumferential base 592 which substantially surrounds the set of stationary or rotating turbine components 530 radially outward of working fluid flow passage 507 which passes through/between set of stationary or rotating turbine components 530. Circumferential base 592 may be secured to the set of stationary or rotating turbine components 530 by one or more peens 536 and may include a radial flange 596 which extends radially outward from circumferential base 592 to form a seal surface 588 shaped to form a portion of a face seal mating ring.

Figure 7:
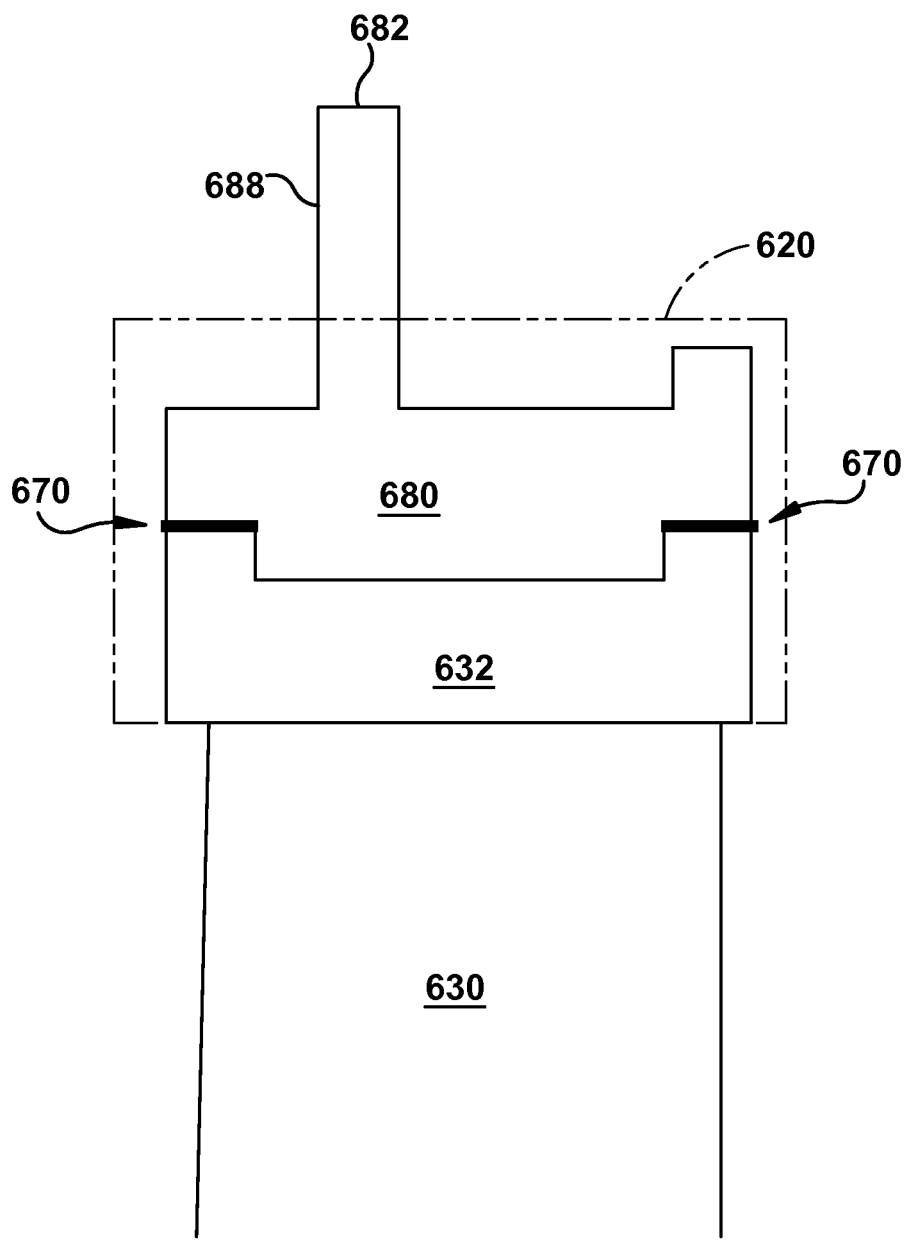
FIG. 7 shows a two-dimensional graphical representation respectively of axially faced seal system connected to a stationary or rotating turbine component in accordance with one embodiment of the invention.
Figure 8:
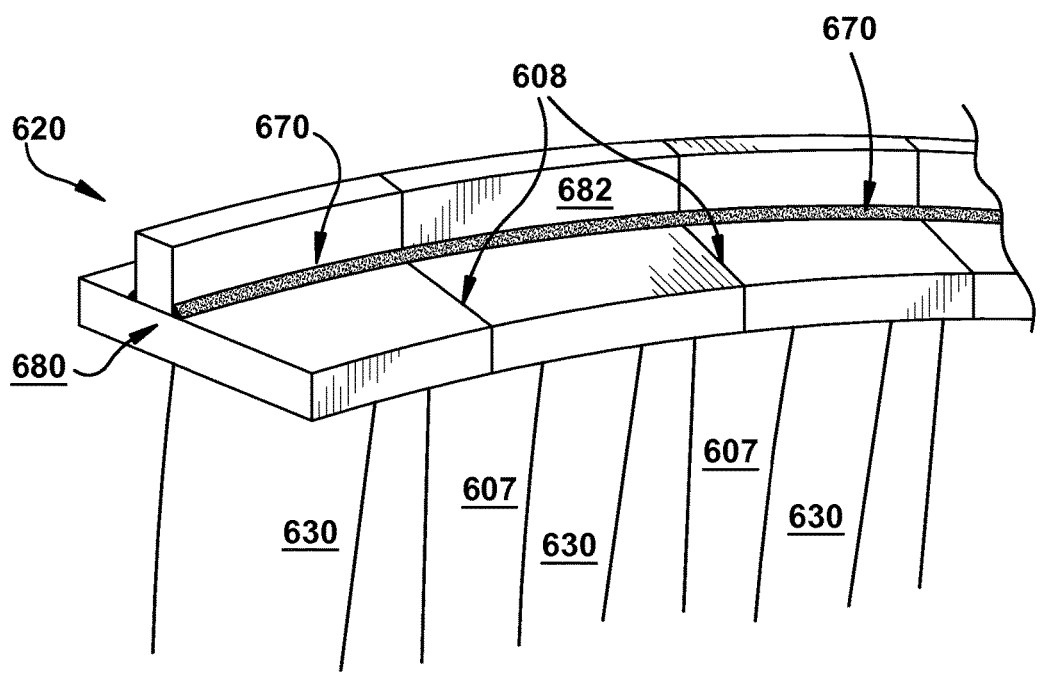
FIG. 8 shows a perspective view respectively of axially faced seal system connected to a stationary or rotating turbine component in accordance with one embodiment of the invention.

Turning to FIGS. 7 and 8, a two-dimensional graphical representation and perspective view, respectively, of axially faced seal system 620 connected to a stationary or rotating turbine component 630 is shown according to embodiments of the invention. In an embodiment, a circumferential base 680 of axially faced seal system 620 may be connected via a set of welds 670 to a radial tip 632 of stationary or rotating turbine component 630. In one embodiment, circumferential base 680 may include a radial flange 682 which extends radially outward from circumferential base 680 to form a seal surface 688 shaped to form a portion of a mating face seal. As can be seen in FIG. 8, seal system 620 may be welded to stationary or rotating turbine components 630 at an interface between radial flange 682 and circumferential base 680. In one embodiment, circumferential base 680 and radial flange 682 may be welded at discrete locations 670 while allowing individual covers to move relative to each other along interface 608, resulting in less distortion of radial flange 680.

Figure 9:
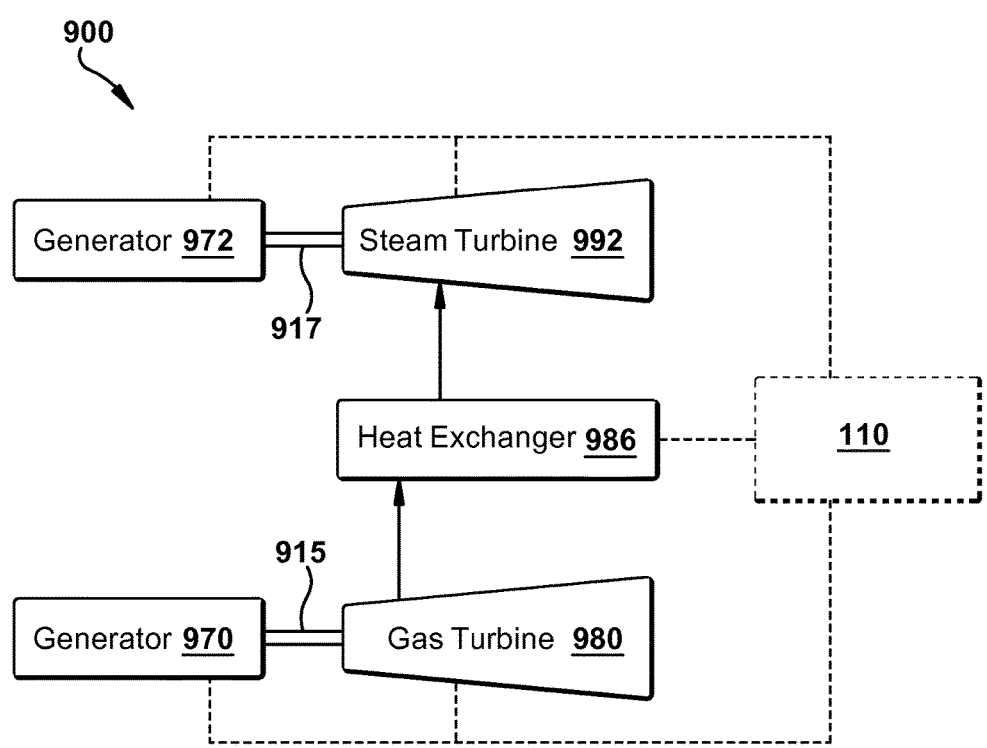
FIG. 9 shows a schematic block diagram illustrating portions of a combined cycle power plant system according to embodiments of the invention.
Figure 10:
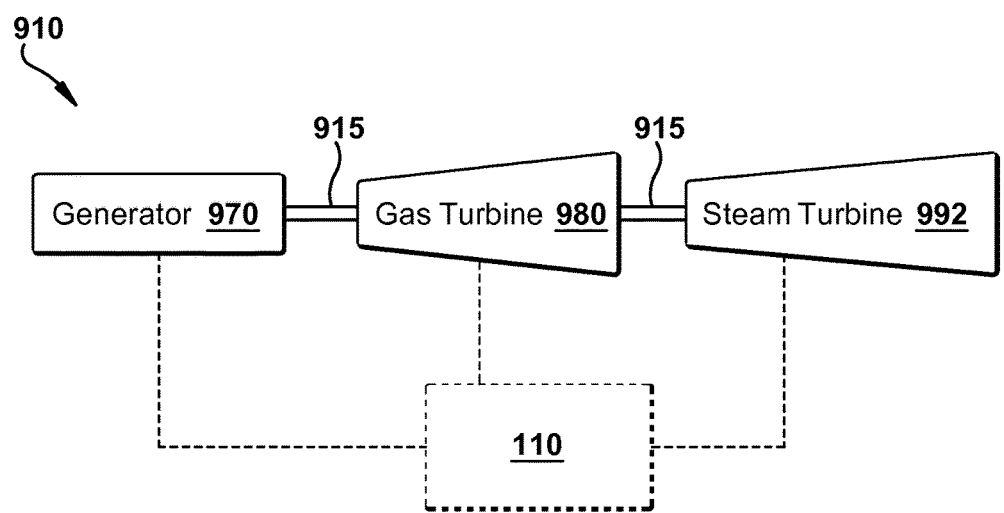
FIG. 10 shows a schematic block diagram illustrating portions of a single-shaft combined cycle power plant system according to embodiments of the invention.

Turning to FIG. 9, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 9 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include seal system (110 of FIG. 2) or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 972 (via a second shaft 917). It is understood that generators 970 and 972 and shafts 915 and 917 may be of any size or type known in the art and may differ depending upon their application or the system to which they are connected. In another embodiment, shown in FIG. 10, a single shaft combined cycle power plant 910 may include a single generator 970 coupled to both gas turbine 980 and steam turbine 992 via a single shaft 915. Steam turbine 992 and/or gas turbine 980 may include first and/or second axially faced seal system (110, 170 of FIG. 2) or other embodiments described herein.

The apparatus and devices of the present disclosure are not limited to any one particular turbine, generator, power generation system or other system, and may be used with other power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the systems, apparatus, and devices described herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An axially faced seal system for a radial tip of a turbine component, the system comprising:
   a stationary turbine component;
   a rotating turbine component having:
      a proximal, radially-inward end;
      a distal, radially-outward end; and
      a ring element adjacent the proximal, radially-inward end of the rotating turbine component;
   a seal ring mounted to the stationary turbine component, the seal ring extending axially to the rotating turbine component and engaging the ring element of the rotating turbine component on a side surface of the ring element; and
   a lock element adapted to limit relative axial movement of the seal ring,
   wherein the side surface is on a continuous, rotating mating ring having a 360 degree arc, and wherein the seal ring is connected to the stationary turbine component by a key member of the seal ring extending into a cell formed in a tip of the stationary turbine component.

2. The axially faced seal system of claim 1, wherein the rotating turbine component has a tip base to receive the continuous, rotating mating ring.

3. The axially faced seal system of claim 2, wherein the tip base and the mating ring are connected using at least one peen.

4. The axially faced seal system of claim 2, wherein the tip base and the mating ring are connected using at least one weld.

5. The axially faced seal system of claim 2, wherein the mating ring is connected to the tip base by a flexible coupling.

6. The axially faced seal system of claim 1, wherein a tip base of the rotating turbine component includes a cell for receiving a key member of the continuous, rotating mating ring.

7. The axially faced seal system of claim 6, further comprising:
a caulking band between the base and the radial tip.

8. The axially faced seal system of claim 1, wherein the mating ring and rotating turbine component are unitary.

9. A turbine comprising:
at least one rotating turbine component having a plurality of blades attached to a rotor, each of the plurality of blades including a proximal end adjacent the rotor and a distal end extending radially outward from the rotor;
a ring element adjacent the proximal end of each of the plurality of blades;
at least one stationary turbine component having a radial tip extending inward toward the rotor; and
at least one axially faced seal system forming a face seal with the at least one rotating turbine component and the at least one stationary turbine component, the at least one axially faced seal system comprising:
a sealing ring mounted to the radial tip of the at least one stationary turbine component, extending axially to the rotating turbine component and sealing against a side surface of the ring element; and
a lock element adapted to limit relative axial movement of the sealing ring,
wherein the rotating ring element is a 360 degree arc,
wherein the sealing ring is connected to the radial tip of the at least one stationary turbine component by a key member of the sealing ring extending into a cell in the radial tip of the at least one stationary turbine component.

10. The turbine of claim 9, wherein the plurality of blades, the ring element, and the rotating turbine component are unitary.

* * * * *